United States Patent
Feng et al.

(10) Patent No.: US 8,585,941 B2
(45) Date of Patent: Nov. 19, 2013

(54) STRUCTURE WITH LUMINOUS AND VISUAL EFFECTS AND LIGHT TRANSMISSIVE SHEET THEREOF AND METHOD FOR MAKING THE SAME

(75) Inventors: Chung-Chih Feng, Kaohsiung (TW); Chun-Yi Kuo, Kaohsiung (TW); Kai-Feng Kang, Kaohsiung (TW); Ko-Feng Wang, Kaohsiung (TW); I-Peng Yao, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 370 days.

(21) Appl. No.: 12/962,970

(22) Filed: Dec. 8, 2010

(65) Prior Publication Data

US 2011/0194293 A1 Aug. 11, 2011

(30) Foreign Application Priority Data

Feb. 5, 2010 (TW) ................................ 99103583 A

(51) Int. Cl.
*B29D 11/00* (2006.01)
(52) U.S. Cl.
USPC ............. 264/1.7; 264/2.7; 264/139; 427/162
(58) Field of Classification Search
USPC ............. 264/1.1, 1, 7, 1.6, 2.7, 139; 427/162, 427/163.1
See application file for complete search history.

(56) References Cited

U.S. PATENT DOCUMENTS 2,948,074 A * 8/1960 Dupree ........................ 40/546

FOREIGN PATENT DOCUMENTS

| JP | 2001272935 A | 10/2001 |
| JP | 2009200333 A | 9/2009 |
| KR | 2011-032078 | * 3/2011 |
| TW | 471389 | 1/2002 |
| TW | 200817178 A | 4/2008 |
| TW | 200846186 A | 12/2008 |

OTHER PUBLICATIONS

Notice of Allowance with search report, issued Apr. 17, 2012, for the counterpart TW Application No. 099103583 of the captioned application, cites references: JP2001272935A, JP2009200333A, TW200817178A, TW200846186A, & TW471389.

* cited by examiner

*Primary Examiner* — Mathieu D. Vargot
(74) *Attorney, Agent, or Firm* — WPAT, P.C.; Anthony King

(57) ABSTRACT

The present invention relates to a structure with luminous and visual effects, a light transmissive sheet thereof, and a method for making the same. The light transmissive sheet includes a first layer, a light transmissive intermediate layer and a second layer. The material of the first layer, the light transmissive intermediate layer and the second layer is polyurethane resin. The light transmissive intermediate layer is disposed on the first layer, and the second layer is disposed on the light transmissive intermediate layer. At least one pattern is formed on the first layer or the second layer, and the pattern penetrates the first layer or the second layer. When light irradiates the light transmissive sheet, the pattern is shown, so the light transmissive sheet has luminous and visual effects.

4 Claims, 5 Drawing Sheets

STRUCTURE WITH LUMINOUS AND VISUAL EFFECTS AND LIGHT TRANSMISSIVE SHEET THEREOF AND METHOD FOR MAKING THE SAME

BACKGROUND OF THE INVENTION

1. Field of the Invention

The present invention relates to a structure with luminous and visual effects, a light transmissive sheet thereof, and a method for making the same, and more particularly to a structure with luminous and visual effects that is capable of showing a particular pattern, a light transmissive sheet thereof, and a method for making the same.

2. Description of the Related Art

Housings of current commercially available 3C electronic products (such as notebooks, digital frames, MP3, and mobile phones) are mostly made of plastic by injection molding, and have numerous limitations in texture, color, tactile feeling, physical properties (such as scratch resistance) and the like, which results in disadvantages such as excessive surface hardness, poor physical properties (poor scratch resistance and poor wear resistance), limited surface colors and limited texture variations. Some other electronic products currently available on the market have housings wrapped with leather, but they are mostly flagship or high-price products. Although the market acceptance and market share of such products are expected to increase, such products are not in line with the current fashion trends due to lack of luminous and visual effects.

Therefore, it is necessary to provide an innovative and inventive structure with luminous and visual effects, a light transmissive sheet thereof, and a method for making the same to solve the above problems.

SUMMARY OF THE INVENTION

The present invention provides a method for making a light transmissive sheet, which includes: (a) providing a release paper; (b) coating a second layer onto the release paper, in which the material of the second layer comprises polyurethanes resin; (c) coating a light transmissive intermediate layer onto the second layer, in which the material of the light transmissive intermediate layer comprises polyurethane resin; (d) coating a first layer onto the light transmissive intermediate layer, in which the material of the first layer comprises polyurethanes resin; (e) removing the release paper; and (f) partially removing the first layer or the second layer, so that at least one pattern is formed on the first layer or the second layer, and the at least one pattern penetrates the first layer or the second layer, so as to partially expose the light transmissive intermediate layer. The present invention further provides a light transmissive sheet made by the above-mentioned method, and a structure comprising the light transmissive sheet and a light source.

The present invention further provides a light transmissive sheet, which includes a first layer, a light transmissive intermediate layer, and a second layer. The first layer, the light transmissive intermediate layer and the second layer are formed by polyurethane resin. The light transmissive intermediate layer is disposed on the first layer, and the second layer is disposed on the light transmissive intermediate layer. At least one pattern is formed on the first layer or the second layer, and the pattern penetrates the first layer or the second layer.

The present invention further provides a structure with luminous and visual effects, which includes a light transmissive sheet as described above and a light source. The light source is used to generate light, and irradiates the first layer or the second layer.

When the light source is not turned on, the surface of the light transmissive sheet is the same as other conventional sheets when viewed from the top. However, after the light source is turned on, the at least one pattern is shown, so the light transmissive sheet has luminous and visual effects. If the first layer, the light transmissive intermediate layer and the second layer are designed with different colors as required, the light transmissive sheet can present luminous and visual effects with special colors. In addition, the surface of the light transmissive sheet can have a stylish texture and a distinctive tactile feeling.

BRIEF DESCRIPTION OF THE DRAWINGS

FIG. 11 is a schematic view illustrating the operation of the first embodiment of the structure with luminous and visual effects according to the present invention when the light source is turned on.

DETAILED DESCRIPTION OF THE INVENTION

Figure 1:
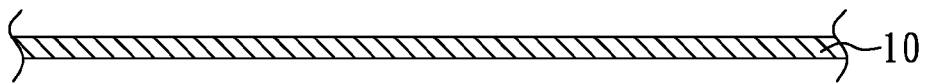
FIGS. 1 to 7 are schematic views of a first embodiment of a method for making a light transmissive sheet according to the present invention.
Figure 2:
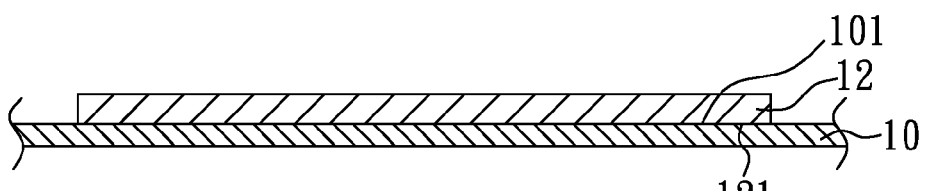

FIGS. 1 to 7 show schematic views of a first embodiment of a method for making a light transmissive sheet according to the present invention. The present invention includes the following steps. First, as shown in FIG. 1, a release paper 10 is provided. The release paper 10 has a surface 101. Preferably, the surface 101 has at least one release texture (not shown). Then, as shown in FIG. 2, a second layer 12 is coated onto the release paper 10. The second layer 12 has a surface 121, and is in contact with the surface 101 of the release paper 10. The formulation of the second layer 12 includes polyurethane resin, a solvent, an antiwear agent and a colorant. Preferably, the second layer 12 at least contains 5 to 50 wt % of polyurethanes resin, 0.05 to 5 wt % of the antiwear agent, 0.05 to 15 wt % of the colorant, 40 to 75 wt % of methyl-ethyl ketone (MEK), 5 to 15 wt % of dimethylformamide (DMF), and 1 to 15 wt % of toluene (TOL). The solid content of the polyurethane resin is lower than 35 wt %, preferably, 15 to 35 wt %. In an embodiment, the second layer 12 contains about 10 wt % of polyurethane resin, 3 wt % of the antiwear agent, 10 wt % of the colorant, 50 wt % of MEK, 15 wt % of DMF, and 12 wt % of TOL. Preferably, the antiwear agent contains silicone, so as to increase the wear resistance of the second layer 12. The colorant can increase the UV resistance and solvent resistance, and preferably, the particle size of the colorant is smaller than 1 μm.

Then, the second layer 12 is dried at 70° C. to 110° C. It should be noted that the second layer 12 may also be formed by a plurality of second sub-layers (not shown), that is, a plurality of second sub-layers (not shown) is coated and then dried so as to form the second layer 12.

Figure 3:
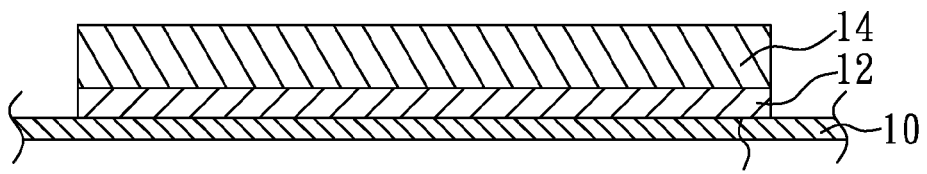

Then, as shown in FIG. 3, a light transmissive intermediate layer 14 is coated onto the second layer 12. The material of the light transmissive intermediate layer 14 comprises polyurethane resin. The light transmissive intermediate layer 14 at least contains 60 to 90 wt % of polyurethane resin, 0.05 to 15 wt % of a colorant, 1 to 10 wt % of MEK, 5 to 15 wt % of DMF, 1 to 15 wt % of TOL, 1 to 15 wt % of a crosslinker, and 1 to 5 wt % of an auxiliary agent. The solid content of the polyurethane resin is higher than 60 wt %. The auxiliary agent is used to raise flowability. After the auxiliary agent is added into the light transmissive intermediate layer 14, the flowability of the light transmissive intermediate layer 14 is raised, and the effect of coating is raised. The auxiliary agent may be a organic compound, i.e., a multi carbon chain compound extracted from heavy oil and light oil.

In an embodiment, the light transmissive intermediate layer 14 contains 80 wt % of polyurethane resin, 3 wt % of the colorant, 5 wt % of MEK, 3 wt % of DMF, 2 wt % of TOL, 5 wt % of the crosslinker, and 2 wt % of the auxiliary agent. Then, the light transmissive intermediate layer 14 is dried at 120° C. to 160° C.

Figure 4:
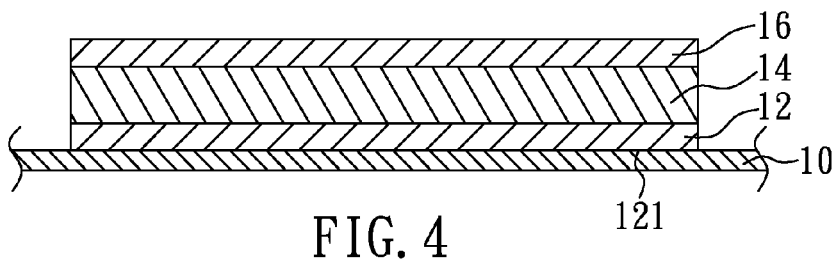

Then, as shown in FIG. 4, a first layer 16 is coated onto the light transmissive intermediate layer 14. The material of the first layer 16 comprises polyurethane resin, and preferably thermoplastic polyurethane resin. The first layer 16 at least contains 5 to 50 wt % of polyurethane resin, 50 to 95 wt % of MEK, 5 to 15 wt % of DMF, and 1 to 15 wt % of TOL. The solid content of the polyurethane resin is lower than 35 wt %, preferably, 15 to 35 wt %. In an embodiment, the first layer 16 contains about 10 wt % of polyurethanes resin, 80 wt % of MEK, 8 wt % of DMF, and 2 wt % of TOL. Then, the first layer 16 is dried at 70° C. to 110° C. It should be noted that the first layer 16 may also be formed by a plurality of first sub-layers (not shown), that is, a plurality of first sub-layers (not shown) is coated and then dried so as to form the first layer 16.

Figure 5:
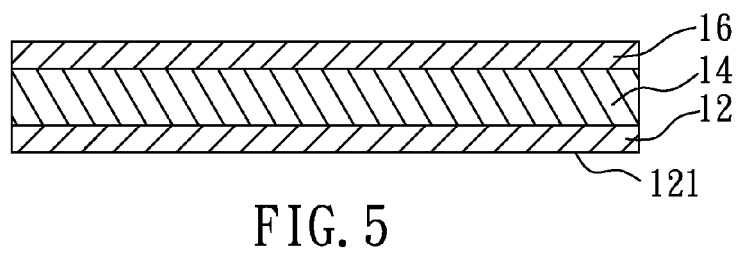

Then, as shown in FIG. 5, the release paper 10 is removed. Preferably, the surface 121 of the second layer 12 has at least one surface texture corresponding to the release texture of the release paper 10.

Figure 6:
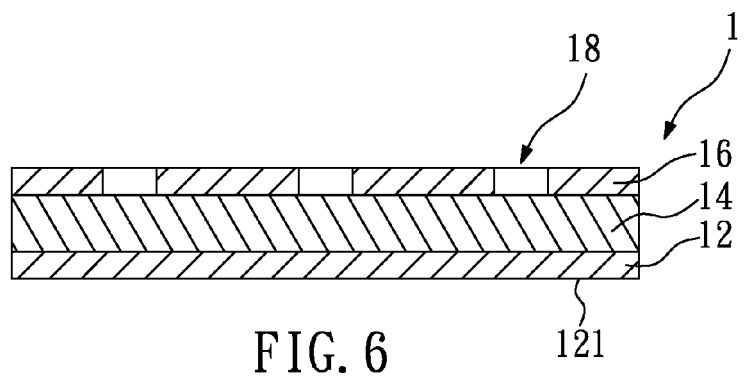

Then, as shown in FIG. 6, the first layer 16 or the second layer 12 is partially removed, so that at least one pattern 18 is formed on the first layer 16 or the second layer 12. The at least one pattern 18 penetrates the first layer 16 or the second layer 12, so as to partially expose the light transmissive intermediate layer 14. In this embodiment, the first layer 16 or the second layer 12 may be partially removed by laser or etching.

In an implementation, as shown in FIG. 6, the second layer 12 is a surface layer, the first layer 16 is a light-shielding layer. The second layer 12 is harder than the first layer 16 and the light transmissive intermediate layer 14, and the second layer 12 and the light transmissive intermediate layer 14 have better transmittance than the first layer 16. The first layer 16 has a deeper color than the second layer 12 and the light transmissive intermediate layer 14, for example, the first layer 16 is black, the second layer 12 is red or green, and the light transmissive intermediate layer 14 is colorless, light red or light green.

The first layer 16 is partially removed in the removing step, so that at least one pattern 18 is formed on the first layer 16, and the at least one pattern 18 penetrates the first layer 16, thereby fabricating a light transmissive sheet 1 of a first embodiment of the present invention.

Figure 7:
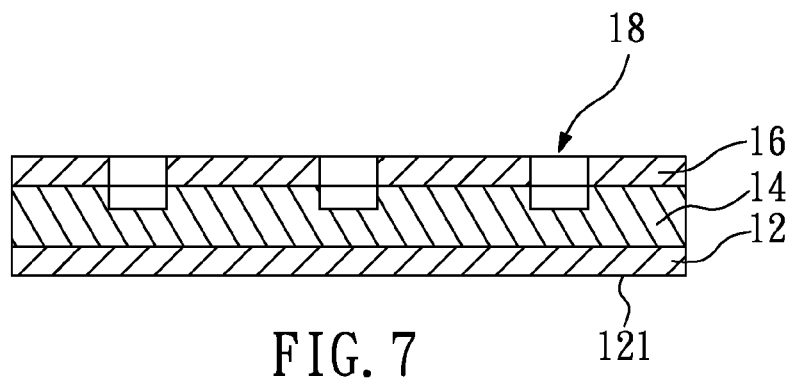

As shown in FIG. 7, if required, the light transmissive intermediate layer 14 may further be partially removed, so that the at least one pattern 18 extends to the light transmissive intermediate layer 14, or even penetrates the light transmissive intermediate layer 14.

Figure 8:
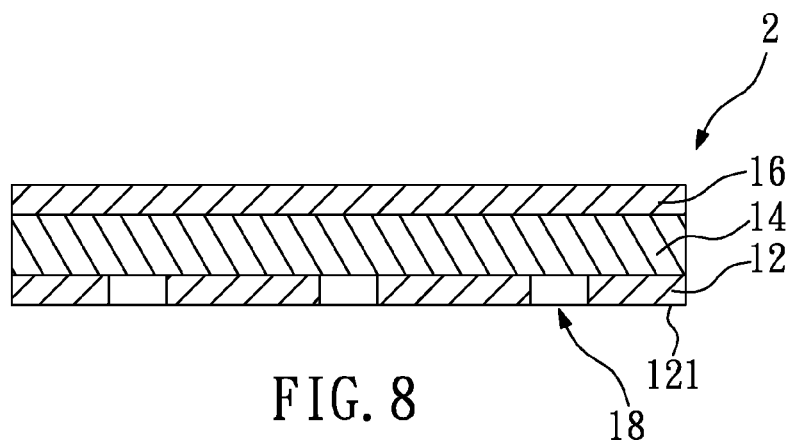
FIG. 8 is a schematic view of another embodiment of the method for making a light transmissive sheet according to the present invention.

In another embodiment, as shown in FIG. 8, the first layer 16 is a surface layer and further contains an antiwear agent. The second layer 12 is a light-shielding layer, and is formed by a thermoplastic polyurethane resin. The first layer 16 is harder than the second layer 12 and the light transmissive intermediate layer 14, and the first layer 16 and the light transmissive intermediate layer 14 have better transmittance than the second layer 12. The second layer 12 has a deeper color than the first layer 16 and the light transmissive intermediate layer 14, for example, the second layer 12 is black, the first layer 16 is red or green, and the light transmissive intermediate layer 14 is colorless, light red or light green.

The second layer 12 is partially removed in the removing step, so that at least one pattern 18 is formed on the second layer 12, and the at least one pattern 18 penetrates the second layer 12, thereby fabricating a light transmissive sheet 2 of a second embodiment of the present invention.

Figure 9:
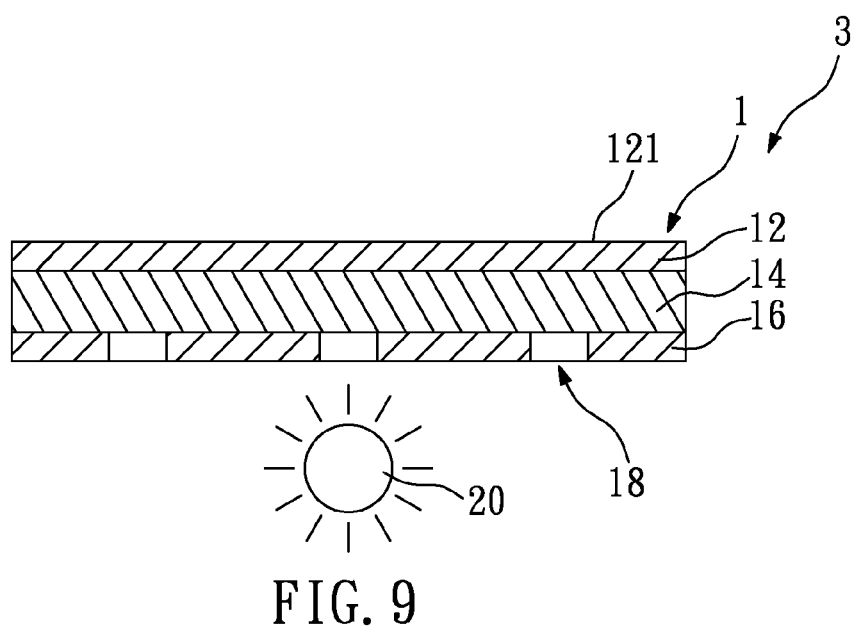
FIG. 9 is a schematic view of a first embodiment of a structure with luminous and visual effects according to the present invention.

FIG. 9 shows a schematic view of a first embodiment of a structure with luminous and visual effects according to the present invention. The structure 3 includes a light transmissive sheet 1 and a light source 20. Preferably, the light transmissive sheet 1 is a housing of an electronic product, and the light source 20 is disposed in the electronic product.

The light transmissive sheet 1 is the sheet 1 of the first embodiment shown in FIG. 6, and includes a first layer 16, a light transmissive intermediate layer 14 and a second layer 12. The first layer 16 is formed by a polyurethane resin having a solid content of lower than 35 wt %, preferably, 15 to 35 wt %. The light transmissive intermediate layer 14 is disposed on the first layer 16, the light transmissive intermediate layer 14 is formed by a polyurethane resin having a solid content of higher than 60 wt %. The second layer 12 is disposed on the light transmissive intermediate layer 14, the second layer 12 is formed by a polyurethane resin having a solid content of lower than 35 wt %, preferably, 15 to 35 wt %. Since the light transmissive intermediate layer 14 and the second layer 12 are formed by coating, the light transmissive intermediate layer 14 is in direct contact with the first layer 16, and the second layer 12 is in direct contact with the light transmissive intermediate layer 14. Preferably, the first layer 16 is formed by a plurality of first sub-layers, and the second layer 12 is formed by a plurality of second sub-layers.

The second layer 12 is a surface layer, and preferably has at least one surface texture and further has an antiwear agent. The first layer 16 is a light-shielding layer formed by a thermoplastic polyurethane resin, the at least one pattern 18 is formed on the first layer 16, and the at least one pattern 18 penetrates the first layer 16. Preferably, the at least one pattern 18 extends into the light transmissive intermediate layer 14, as shown in FIG. 7. The second layer 12 is harder than the first layer 16 and the light transmissive intermediate layer 14. The light source 20 irradiates the first layer 16. The second layer 12 and the light transmissive intermediate layer 14 have better transmittance than the first layer 16. The first layer 16 has a deeper color than the second layer 12 and the light transmissive intermediate layer 14, for example, the first layer 16 is black, the second layer 12 is red or green, and the light transmissive intermediate layer 14 is colorless, light red or light green.

The thickness of the first layer 16 is 0.01 to 0.3 mm, the thickness of the light transmissive intermediate layer 14 is 0.10 to 1.00 mm, the thickness of the second layer 12 is 0.01 to 0.3 mm, and preferably, the light transmissive intermediate layer 14 is thicker than the first layer 16 and the second layer 12. The transmittance of the layers may also be adjusted by adjusting the thickness of the layers.

The light source 20 is used to generate light. In this embodiment, the light source 20 is disposed under the first layer 16 to irradiate the first layer 16. However, in other applications, the light source 20 may also be disposed above the second layer 12 to irradiate the second layer 12.

Figure 10:
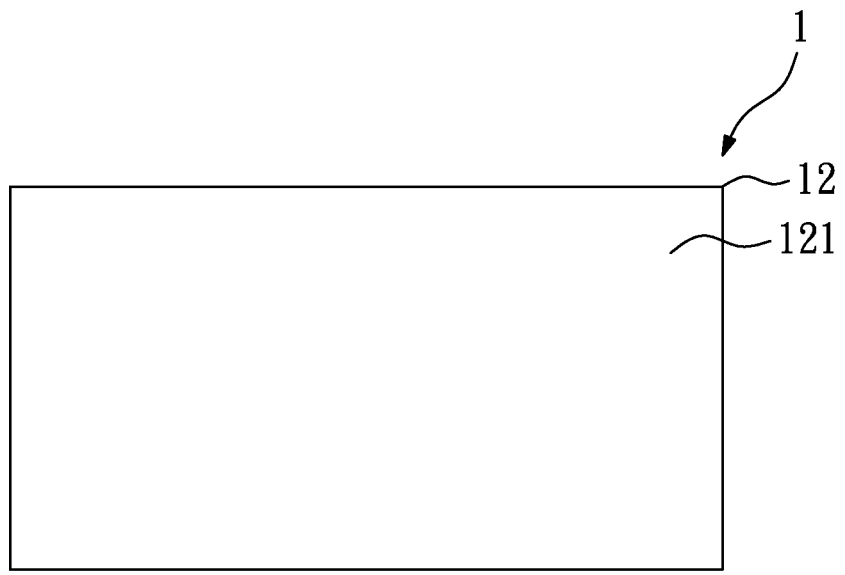
FIG. 10 is a schematic view illustrating the operation of the first embodiment of the structure with luminous and visual effects according to the present invention when the light source is turned off.
Figure 11:
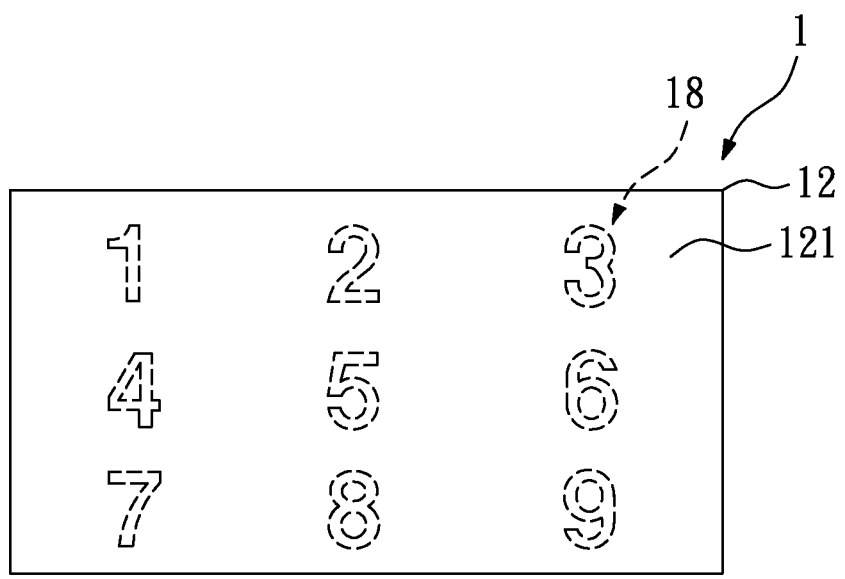

When the light source 20 is turned off, the surface 121 of the light transmissive sheet 1 is the same as other conventional sheets when viewed from the top, as shown in FIG. 10. However, after the light source 20 is turned on, the at least one pattern 18 is shown on the second layer 12, as shown in FIG. 11, so the light transmissive sheet 1 has novel luminous and visual effects. If the first layer 16, the light transmissive intermediate layer 14 and the second layer 12 are designed with different colors as required, the light transmissive sheet 1 can present luminous and visual effects with special colors. In addition, the light transmissive sheet 1 can provide a necessary buffer for the electronic product, so as to protect the electronic product. Moreover, the surface 121 of the light transmissive sheet 1 can have a stylish texture and a distinctive tactile feeling.

Figure 12:
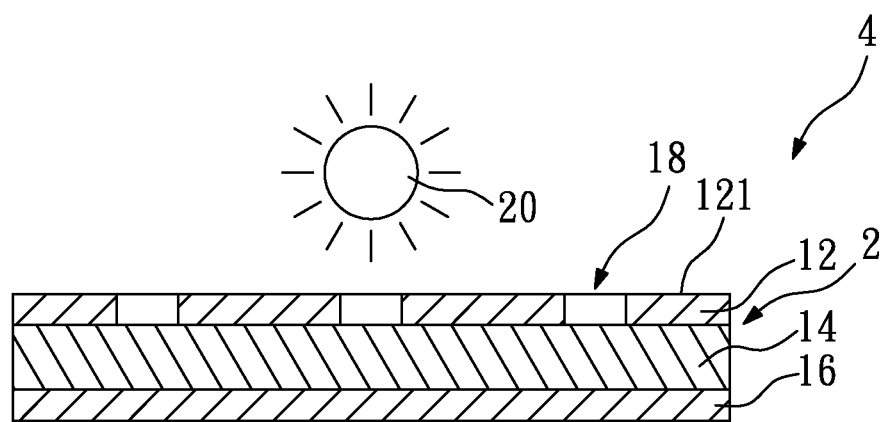
FIG. 12 is a schematic view of a second embodiment of the structure with luminous and visual effects according to the present invention.

FIG. 12 shows a schematic view of a second embodiment of the structure with luminous and visual effects according to the present invention. The structure 4 includes a light transmissive sheet 2 and a light source 20. Preferably, the light transmissive sheet 2 is a housing of an electronic product, and the light source 20 is disposed in the electronic product.

The light transmissive sheet 2 is the sheet 2 of the second embodiment shown in FIG. 8, and includes a first layer 16, a light transmissive intermediate layer 14 and a second layer 12. The first layer 16 is formed by a polyurethane resin having a solid content of lower than 35 wt %, preferably, 15 to 35 wt %. The light transmissive intermediate layer 14 is disposed on the first layer 16, the light transmissive intermediate layer 14 is formed by a polyurethane resin having a solid content of higher than 60 wt %. The second layer 12 is disposed on the light transmissive intermediate layer 14, the second layer 12 is formed by a polyurethane resin having a solid content of lower than 35 wt %, preferably, 15 to 35 wt %. Since the light transmissive intermediate layer 14 and the second layer 12 are formed by coating, the light transmissive intermediate layer 14 is in direct contact with the first layer 16, and the second layer 12 is in direct contact with the light transmissive intermediate layer 14. Preferably, the first layer 16 is formed by a plurality of first sub-layers, and the second layer 12 is formed by a plurality of second sub-layers.

The first layer 16 is a surface layer and further contains an antiwear agent. The second layer 12 is a light-shielding layer, and is formed by a thermoplastic polyurethane resin. The at least one pattern 18 is formed on the second layer 12, and the at least one pattern 18 penetrates the second layer 12. Preferably, the at least one pattern 18 extends into the light transmissive intermediate layer 14. The first layer 16 is harder than the second layer 12 and the light transmissive intermediate layer 14. The light source 20 irradiates the second layer 12, and the first layer 16 and the light transmissive intermediate layer 14 have better transmittance than the second layer 12. The second layer 12 has a deeper color than the first layer 16 and the light transmissive intermediate layer 14, for example, the second layer 12 is black, the first layer 16 is red or green, and the light transmissive intermediate layer 14 is colorless, light red or light green.

The thickness of the first layer 16 is 0.01 to 0.3 mm, the thickness of the light transmissive intermediate layer 14 is 0.10 to 1.00 mm, and the thickness of the second layer 12 is 0.01 to 0.3 mm. Preferably, the light transmissive intermediate layer 14 is thicker than the first layer 16 and the second layer 12. The transmittance of the layers may also be adjusted by adjusting the thickness of the layers.

The light source 20 is used to generate light. In this embodiment, the light source 20 is disposed above the second layer 12 to irradiate the second layer 12. However, in other applications, the light source 20 may also be disposed under the first layer 16 to irradiate the first layer 16.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A method for making a light transmissive sheet, comprising:
    (a) providing a release paper;
    (b) coating a second layer onto the release paper, wherein the second layer at least contains 5 to 50 wt % of polyurethane resin, 0.05 to 15 wt % of a colorant, 40 to 75 wt % of methyl-ethyl ketone (MEK), 5 to 15 wt % of dimethylformamide (DMF), and 1 to 15 wt % of toluene (TOL), wherein a solid content of the polyurethane resin is 15 to 35 wt %;
    (c) drying the second layer;
    (d) coating a light transmissive intermediate layer onto the second layer, wherein the light transmissive intermediate layer at least contains 60 to 90 wt % of polyurethane resin, 0.05 to 15 wt % of a colorant, 1 to 10 wt % of MEK, 5 to 15 wt % of DMF, 1 to 15 wt % of TOL, 1 to 15 wt % of a crosslinker, and 1 to 5 wt % of an auxiliary agent, wherein a solid content of the polyurethane resin is higher than 60 wt %;
    (e) drying the light transmissive intermediate layer;
    (f) coating a first layer onto the light transmissive intermediate layer, wherein the first layer at least contains 5 to 50 wt % of polyurethane resin, 50 to 95 wt % of MEK, 5 to 15 wt % of DMF, and 1 to 15 wt % of TOL, wherein a solid content of the polyurethane resin is 15 to 35 wt %;
    (g) drying the first layer;
    (h) removing the release paper; and
    (i) partially removing the first layer or the second layer, so that at least one pattern is formed on the first layer or the second layer, and the at least one pattern penetrates the first layer or the second layer, so as to partially expose the light transmissive intermediate layer.

2. The method according to claim 1, wherein the second layer is a surface layer and further contains an antiwear agent, the first layer is a light-shielding layer, the first layer is formed by a thermoplastic polyurethane resin, the second layer is harder than the first layer and the light transmissive intermediate layer, the second layer and the light transmissive intermediate layer have better transmittance than the first layer, and step (i) partially removes the first layer, so that at least one pattern is formed on the first layer, and the at least one pattern penetrates the first layer.

3. The method according to claim 1, wherein the first layer is a surface layer and further contains an antiwear agent, the second layer is a light-shielding layer, the second layer is formed by a thermoplastic polyurethane resin, the first layer is harder than the second layer and the light transmissive intermediate layer, the first layer and the light transmissive intermediate layer have better transmittance than the second layer, and step (i) partially removes the second layer, so that at least one pattern is formed on the second layer, and the at least one pattern penetrates the second layer.

4. The method according to claim 1, wherein step (i) further comprises partially removing the light transmissive intermediate layer, so that the at least one pattern extends into the light transmissive intermediate layer.

\* \* \* \* \*